July 27, 1965   M. G. BROWN ETAL   3,196,586
SHAPING TOOL FOR CELLULAR POLYSTYRENE
Filed July 1, 1963
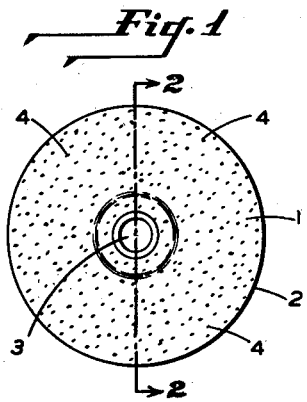
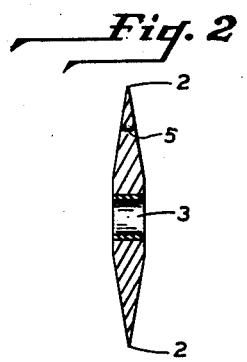
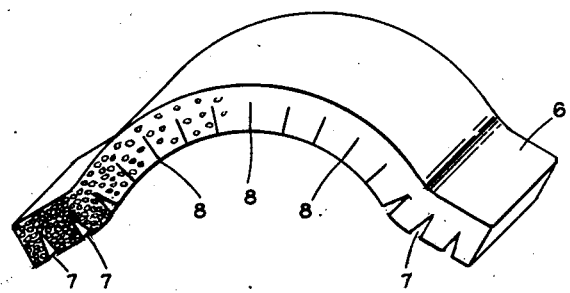
INVENTOR.
MILTON G. BROWN
FRED F. PLATNER
BY ately be fabricated of a metal; aluminum is the metal of choice. The disc rotates at high speeds and metal, as opposed to plastic or wood, is better adapted to withstand the stresses. Aluminum is light and an excellent heat conductor, and this excellent heat conductivity helps to keep the tool in use. Other metals such as copper or any of the copper alloys, or any of the various steels could also be used. The cutting surface of the base member 1 extends from the edge 2 thereof to the hub 3. The cutting surface has disposed thereover a series of grits 4. The grits are conventional abrading materials such as any of the carbides, for example, tungsten carbide, boron carbide, or silicon carbide. The grits may also comprise garnet, sand, aluminum oxide, and any other of the abrasive grits normally used in making cutting tools. In the present invention, however, the individual particle size of the grits should be relatively large, generally standing up from the cutting face a distance in the range of $\frac{1}{64}$–$\frac{1}{8}$ inch. Grit size will be in the range 60 to 30. The grits are individually disposed on the cutting faces. Each is a separate particle spaced from all the others by a distance of at least $\frac{1}{16}$ inch, but no more than $\frac{1}{2}$ inch. The spacing between the grits is necessary in order that air may be carried into the foam polystyrene while it is being cut and thus serve as a cooling medium at the site of the heat. Although each individual grit may be soldered to the circular base member, it is not necessary that each grit be so strongly adhered. Foamed polystyrene is a relatively soft and friable material, and accordingly each grit may be adhesively secured to the base member by means of an epoxy adhesive, or other curable adhesive which forms a strong bond on cure. It is preferable not to coat the entire cutting surface with an adhesive layer and then drop the grits on the coated surface while the adhesive is in an uncured condition since the interposition of the adhesive film cuts down the ability of the base member to carry away heat from the cutting site.

The opposing cutting faces of the base member 1 form an angle 5 whose apex is the edge 2, as shown in FIG. 2. The angle 5 should be in the range of 8°–12°, and preferably 10°, in order to cut shaped grooves in foam polystyrene objects. Angles outside this range are not useful for allowing the formation of foamed polystyrene sheets and boards which may be readily formed around circular objects.

FIG. 3 shows a polystyrene board 6 in which a series of V-shaped grooves 7 have been cut side by side along the length of the board. The polystyrene board 6 has been bent into the form of a circle at the center part thereof so that the V-shaped grooves 7 are closed at the slices 8 thus allowing the board 6 to be shaped in the form of a hemisphere. If the edge angle 5 of the tool of the present invention is 10°, it will be appreciated that 18 side-by-side cuts will be necessary to bend the board into a half circle. The V-shaped grooves 7 are parallel and spaced equidistance apart, one groove being spaced from the next a distance which is preferably equal to the maximum width of the groove cut in the block, although closer distances may be used if desired.

Referring to FIG. 4, the polystyrene foam board 6 illustrates the several types of shaped grooves that can be cut by the tool of the present invention. The V-shaped groove 7 is made by sliding the board across the cutter in a direction parallel with the planes of the cutting faces so that the cut area corresponds to the upper section of the disc as shown at FIG. 2. The circular groove 10 is made by sliding the board over the top portion of the rotating tool in a direction perpendicular to the planes of the cutting faces of the disc so that the cut groove corresponds to the shape shown by the upper portion of FIG. 1. The shaped groove 9 has parabolic walls and is made by sliding the polystyrene board over the cutter at some angle intermediate between the perpendicular and the parallel.

As a general rule, the density and hence the strength of the polystyrene foam board or block will control the depth of the grooves cut in the block. If the apex of the groove cut by the edge 2 of the tool is too close to the surface of the board, breakage may occur when the board is bent to conform to some circular configuration. As a general rule, about ½ inch of uncut material is desirable between the apex of the cut and the unbroken surface of the board.

Size of the disc-shaped tool of the present invention will vary according to the need, but will be of a diameter in the range 6–18 inches. A diameter of 12 inches is the preferred diameter since it gives good all-around usage. The disc will normally rotate at 1750–3500 revolutions per minute in order to quickly and efficiently cut away foam polystyrene.

We claim:
1. A disc-shaped tool adapted to cut foam polystyrene comprising a circular base member having planar opposing cutting faces forming an angle in the range of 8°–12° at the outer peripheral edge thereof, and a multiplicity of separate spaced particles of grit in a grit size range of 60 to 30 individually disposed on said cutting surfaces from the edge thereof to the hub of the tool and spaced from each other a distance in the range $1/16$–$1/2$ inch.
2. A tool according to claim 1 wherein said base member is made of aluminum.
3. A tool according to claim 1 wherein said angle is 10°.
4. A tool according to claim 1 wherein said grit protrudes above the cutting face a distance in the range $1/64$–$1/8$ inch.
5. A tool according to claim 1 wherein said grit is adhered to said base member by means of an epoxy resin.

References Cited by the Examiner
UNITED STATES PATENTS

| | | | |
|---|---|---|---|
| 270,384 | 1/83 | Call | 51—209 |
| 820,474 | 5/06 | Buchanan | 32—59 |
| 2,223,864 | 12/40 | Zublin | 51—209 X |
| 2,595,733 | 5/52 | Tone et al. | |

LESTER M. SWINGLE, *Primary Examiner.*